Dec. 24, 1940.　　　　F. D. FRISBY　　　　2,225,827

AIR INLET DEVICE FOR AUTOMOBILE BODIES

Filed March 9, 1938

INVENTOR:
FRANK D. FRISBY

By *Mello R. Church*
ATTORNEY.

Patented Dec. 24, 1940

2,225,827

UNITED STATES PATENT OFFICE 2,225,827

AIR INLET DEVICE FOR AUTOMOBILE BODIES

Frank D. Frisby, St. Louis, Mo.

Application March 9, 1938, Serial No. 194,811

2 Claims. (Cl. 98—2)

This invention relates to air inlet devices of the kind that are used to admit air to automobile bodies of the closed type, to ventilate the same.

One object of my invention is to provide an air inlet device for automobile bodies, that is an improvement upon the conventional cowl ventilator in that it does not require an opening or openings to be formed in an exposed external portion of the body; it effectively prevents rain, dirt or other foreign matter from being carried into the body by an inwardly flowing stream of air and it causes an ample supply of fresh, relatively cool or unheated air to be admitted to the body.

Figure 1:
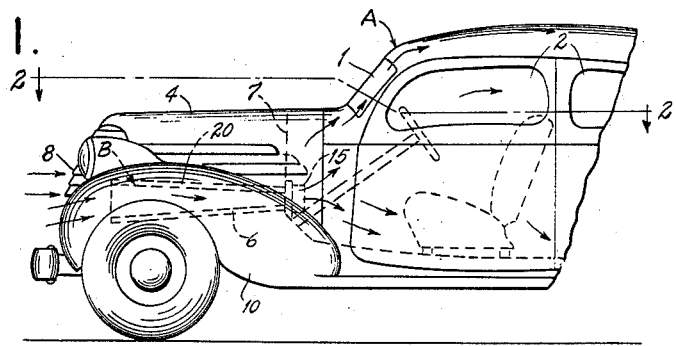

Figure 1 of the drawing is a fragmentary side elevation of an automobile equipped with an air inlet device constructed in accordance with my invention, showing by means of arrows how fresh, relatively cool or unheated air is admitted to the body of the automobile.

Figure 2:
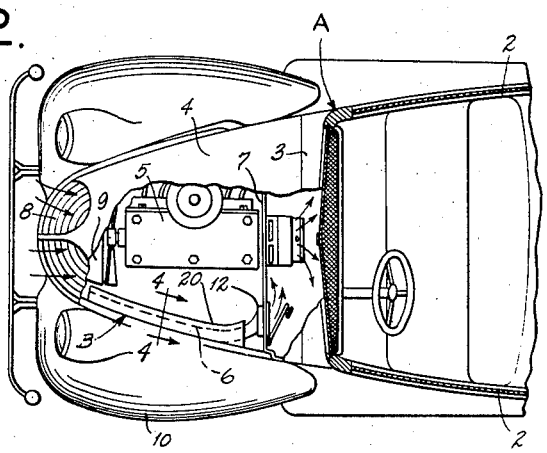

Figure 2 is a horizontal longitudinal sectional view taken on approximately the line 2—2 of Figure 1.

Figure 3:
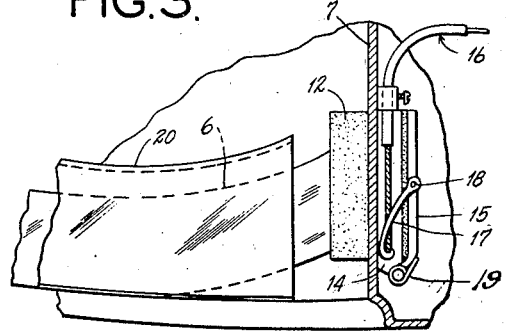
Figure 4:
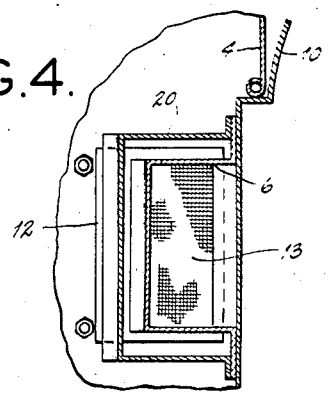

Figure 3 is a fragmentary side elevational view of the rear end portion of the air inlet device illustrating the manually operable control means that is used to open, close and vary the angular position of the door at the discharge end of the air inlet device; and Figure 4 is a vertical transverse sectional view taken on the line 4—4 of Figure 2 looking in the direction indicated by the arrows, illustrating the details of construction of the air inlet device.

Referring to the drawing, A designates as an entirety an automobile body of the closed type which is equipped with one or more seats for the occupants, shown in broken lines in Figure 1, a wind-shield 1, side wall windows 2 and a cowl portion 3 that merges into the hood 4 which encases or protects the engine 5 of the automobile.

The air inlet device B which constitutes my present invention, is of novel construction and arrangement and preferably comprises an air duct 6 that is arranged at one side of the engine 5 between the dash 7 of the body and the grill or grating 8 that is positioned in front of the radiator 9 of the cooling system of the engine. As shown in Figure 2, said air inlet device B is arranged in offset relationship with the radiator 9, or is positioned at one side of said radiator, so that fresh, unheated air will flow into the front end of the device B when the automobile is in forward motion. Said air duct 6 is preferably constructed of sheet metal and it is made of such shape and dimensions in transverse cross section that it can conveniently be attached directly to the left-hand front fender 10, as shown in Figures 2 and 4. In automobiles of older model that comprise an engine hood provided with hinged depending side portions that are spaced some distance inwardly from the skirt portions of the front fenders, the air duct may be arranged inside of the said hinged depending side portions of the hood and mounted on or attached to any suitable kind of a supporting structure. The specific construction and the particular location of the air inlet device B are not essential, so far as my broad idea is concerned, so long as said device be of such form or design that it does not spoil the symmetry of the automobile, or detract from the appearance of same, and so long as said device be so arranged or located that the air which enters same will be relatively cool or unheated air, or, in other words, air that has not passed through the radiator 9 of the cooling system. In order to facilitate the installation of the air inlet device B and eliminate strains, rattles, and squeaks resulting from relative movement between the body and the part of the automobile to which the air inlet duct 6 is riveted or rigidly attached, the rear end portion of said duct is joined to the dash 7 of the body by a rubber coupling member 12 mounted in the dash, as shown in Figure 3, and interlocked or attached to the same, said coupling member being provided with a forwardly projecting tubular portion that surrounds the rear terminal end of the air duct 6 and thus securely holds it in position. One or more screens or filtering devices 13 are preferably arranged inside of the air duct 6 so as to prevent dirt and other foreign matter from being carried into the body with the inwardly flowing air. Inasmuch as said air duct is several feet in length and the intake end of same is located behind the grill that is positioned in front of the radiator, there is no possibility of rain being carried into the vehicle body with the air supplied by said duct. A metal collar 14, that surrounds the rubber coupling member 12 on the inside of the dash, carries a hinged door 15 which is used to regulate the admission of air to the body through the air inlet device B or change the direction of flow from said device. Any suitable kind of means may be used to open, close or change the position of the door 15, but the means herein illustrated for this purpose consists of a conventional Bowden wire, designated as an entirety by the reference character 16 in Figure 3, attached to an operating arm 17 on a rock shaft 18 which carries the door 15 and leading to a manually operable control device within reach of the driver in charge of the automobile. If desired, a spring 19 may be employed to normally hold the door 15 in its closed position. In order to prevent the air duct 6 from becoming excessively heated by the heat which radiates from the engine, said air duct is surrounded or partially surrounded by an open-ended jacket 20 spaced away from same and having its rear end terminating short of the dash 7, as illustrated in Figure 3. When the vehicle is traveling forwardly a sufficient volume of air will circulate through the space between the air duct 6 and the jacket 20 to prevent said duct from becoming excessively heated, the air that circulates through the jacket escaping from the same into the engine compartment of the automobile.

An air inlet device of the construction above described is an improvement upon the conventional cowl ventilator, in that it provides a simple way of supplying an ample supply of relatively cool or unheated air to the body, without forming an opening in an exposed external portion of the body.

Having thus described my invention, what I claim as new and desire to secure by Letters Patent is:

1. An automobile equipped with an air inlet device for admitting air to the body of the automobile to ventilate the same, said device being arranged at one side of the engine compartment of the automobile between a radiator grill and the dash of the body, and having an opening at its front end disposed in offset relationship with the radiator of the automobile, so as to insure that relatively cool or unheated air will enter said device, then flow through same, and thereafter escape through a discharge opening at the rear end of said device and enter the body, and an open-ended air jacket combined with said air inlet device and disposed so that when the automobile is traveling forwardly, a current of air will circulate through said jacket and thus tend to prevent the circulating air in said inlet device from absorbing heat which radiates from the engine of the automobile.

2. An automobile of the kind described in claim 1, provided with a front fender having a skirt portion that carries said air inlet device and said air jacket.

FRANK D. FRISBY.